Jan. 14, 1941. J. L. DRAKE 2,228,347
PROCESS AND APPARATUS FOR MELTING GLASS
Filed June 2, 1938 2 Sheets-Sheet 2

Inventor
JOHN L. DRAKE.
By Frank Fraser
Attorney

Patented Jan. 14, 1941

2,228,347

UNITED STATES PATENT OFFICE 2,228,347

PROCESS AND APPARATUS FOR MELTING GLASS

John L. Drake, Toledo, Ohio, assignor to Libbey-Owens-Ford Glass Company, Toledo, Ohio, a corporation of Ohio Application June 2, 1938, Serial No. 211,344

22 Claims. (Cl. 49—54)

The present invention relates to an improved process and apparatus for melting glass and is particularly applicable in connection with a continuous tank furnace for supplying molten glass to a sheet or plate glass forming machine, although of course not restricted to such use.

An important object of the invention is the provision of a process and apparatus whereby the relative temperatures in the melting and refining ends of the furnace can be controlled independently of one another so that the most desirable conditions may be obtained in the melting and fining of the glass.

Another important object of the invention is the provision of a process and apparatus whereby the molten glass in the refining end of the furnace can be subjected to a desired cooling action to bring it to a proper temperature for delivery to the sheet forming machine without in any way affecting that portion of the glass undergoing melting.

A further important object of the invention is the provision of a process and apparatus wherein the molten glass in the refining end of the furnace is adapted to be subjected to a relatively mild or moderate cooling or chilling action which, while thoroughly effective to properly condition the glass for formation into a sheet, will not cause any severe or drastic surface chilling of the glass which might have an adverse effect thereon.

Still another important object of the invention is the provision of such a process and apparatus wherein the artificial cooling or chilling of the glass in the refining end of the furnace can be accomplished in such a manner that a more uniform temperature may be maintained therein from one side of the furnace to the other.

Other objects and advantages of the invention will become more apparent during the course of the following description when taken in connection with the accompanying drawings.

In the drawings wherein like numerals are employed to designate like parts throughout the same:

Figure 1:
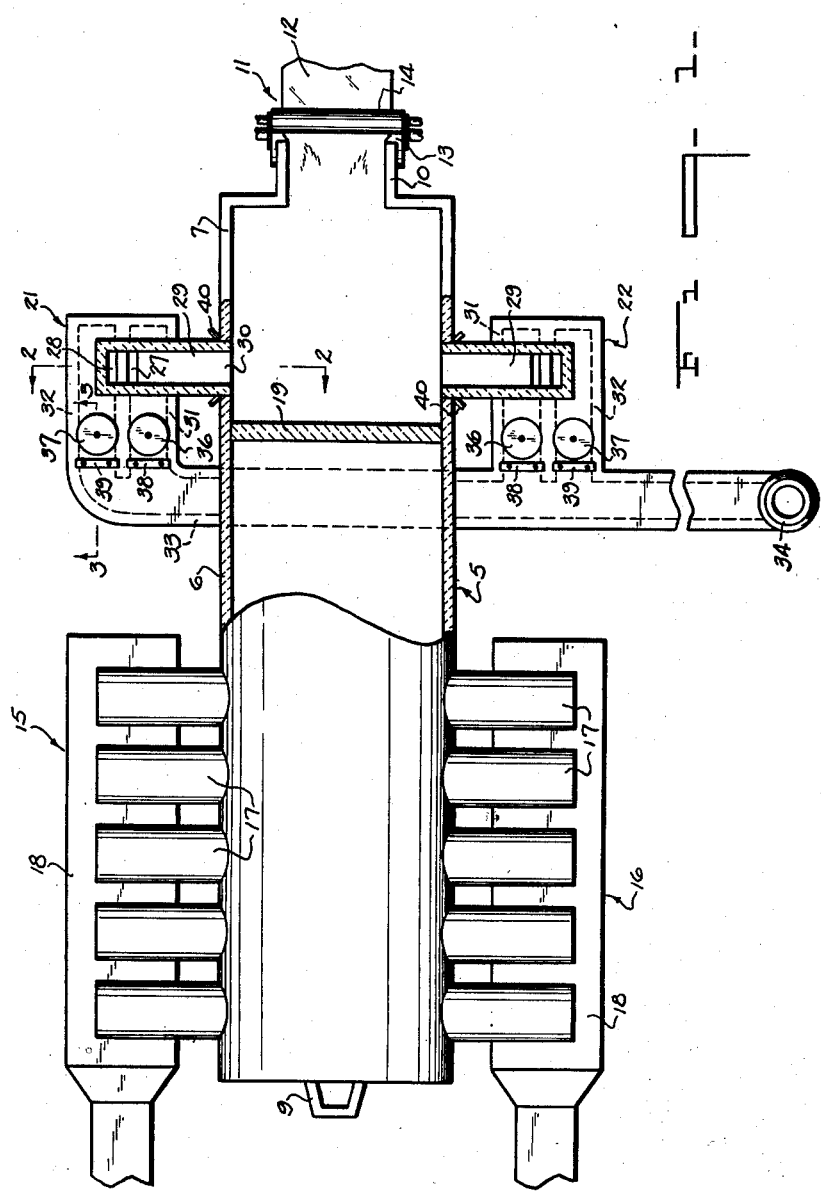
Fig. 1 is a plan view, partially in section, of a continuous tank furnace embodying the present invention.
Figure 2:
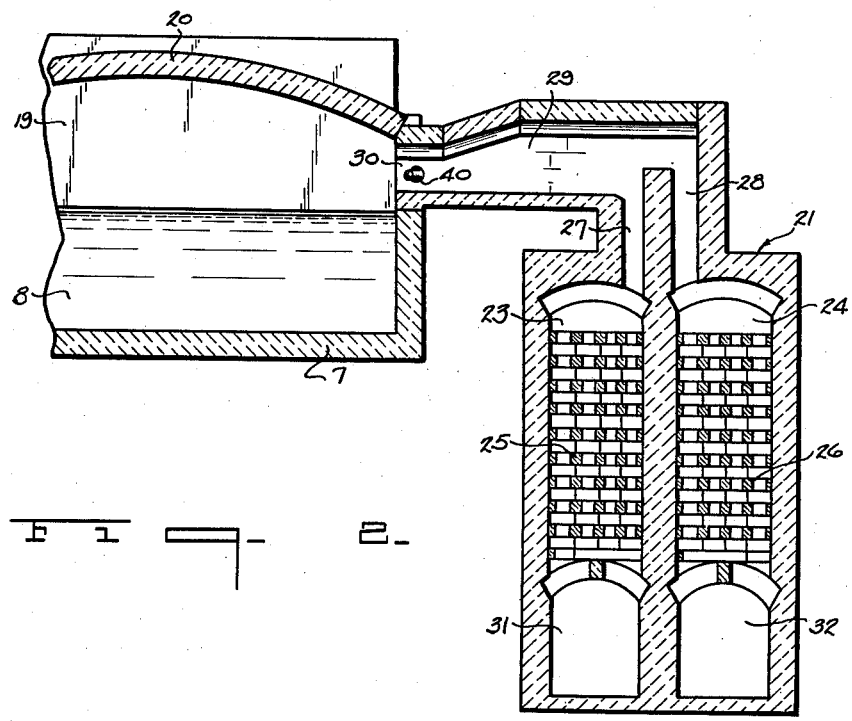
Fig. 2 is a transverse section taken substantially on line 2—2 of Fig. 1.
Figure 3:
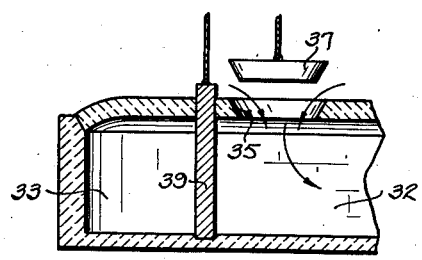
Fig. 3 is a detail section taken substantially on line 3—3 of Fig. 1.

In the drawings, wherein for the purposes of illustration is shown a preferred embodiment of the invention, the numeral 5 designates in its entirety a continuous tank furnace of the regenerative type which includes a melting end or section 6 and a refining end or section 7, said sections being substantial continuations of one another and containing a body of molten glass 8. The glass batch, which is to be converted into the finished product, is fed into the rear end of the furnace through a so-called doghouse 9 and is reduced to molten glass in the melting end 6. The body of molten glass 8 as thus melted moves slowly forward through the furnace into the refining end 7, from which it flows into the working end or section 10. The molten glass is delivered from said working section 10 to a sheet forming machine generally shown at 11 which serves to form the glass into a continuous sheet 12. While the forming machine 11 has been illustrated as including a pair of driven rolls 13 and 14 for rolling the glass to sheet form, it will be readily appreciated that the invention may be applied to furnaces having any method of delivery and having associated therewith any type of sheet or plate glass blank forming machine or apparatus.

The melting end of the furnace is adapted to be heated by the regenerative heating means 15 and 16 arranged at opposite sides thereof and each including the gas and air passages 17 leading to a regenerator 18. The regenerators 18 may be of any well known or preferred construction and are adapted to be reversed at stated intervals in the usual manner so that the gas flames issue from the regenerators into the furnace first from one side and then from the opposite side thereof.

According to the invention, the melting end 6 of the furnace is adapted to be completely separated from the refining end 7 thereof so that the melting operation can be carried on as required to best suit conditions therein without in any way affecting the glass in the refining end. To accomplish this purpose, there is arranged at the juncture of said melting and refining ends of the furnace a vertical curtain or partition wall 19 which extends from approximately the level of the molten glass 8 upwardly through the furnace cap 20. Any suitable means may be provided for supporting the curtain wall and for effecting desired vertical adjustment thereof. Due to the provision of the curtain wall 19, the temperature in the refining end 7 of the furnace can also be controlled entirely independently of and without regard to the temperature in the melting end.

In the production of sheet or plate glass, the temperature treatment of the molten glass is of vital importance, and the glass must pass from a highly heated molten state to a condition where it can be rolled or otherwise formed into a sheet or plate as it flows through the refining end of the furnace. As brought out above, it is an aim of this invention to effect a positive cooling or chilling of the molten glass 8 in the refining end of the furnace to bring it to the proper condition for formation into a sheet but without subjecting it to any drastic treatment or abrupt surface chilling. To this end, the present invention embodies means for supplying cooling air to the refining end of the furnace which is of a sufficiently low temperature to effect the desired cooling of the glass but which at the same time has a temperature relatively greater than the atmospheric temperature. More particularly, the invention resides in the setting up of a draft within the refining end of the furnace transversely thereof for withdrawing the heated air from the furnace at one side and simultaneously drawing cooling air into the furnace from the opposite side, together with means for preheating the cooling air, and means effective for reversing the draft to cause the preheated cooling air to enter the furnace alternately from opposite sides thereof.

In carrying out the invention, there is arranged at opposite sides of the refining end 7 of the furnace the regenerative cooling means 21 and 22, each of which comprises a pair of vertical checker-chambers 23 and 24 housing the checker-works 25 and 26, said checker-chambers 23 and 24 having the uptakes 27 and 28 respectively which communicate with a horizontal passage 29 leading to the port 30 in the adjacent side wall of the furnace. The checker-works 25 and 26 terminate above the bottom of the checker-chambers 23 and 24 and formed therebeneath are the horizontal tunnels 31 and 32 which communicate at their outer ends with a conduit 33 leading to a stack 34. It will be seen in Fig. 1 that the tunnels 31 and 32 of both regenerative cooling means 21 and 22 communicate with the conduit 33 so that they all lead to a common stack 34. The tunnels 31 and 32 at each side of the furnace are provided in the top walls thereof with openings 35 controlled by the vertically movable valve plates 36 and 37, while arranged outwardly of the valves 36 and 37 are the vertically movable dampers 38 and 39.

In operation, the glass batch ingredients are introduced into the melting end 6 of the furnace through the doghouse 9 and reduced therein to molten glass 8. The molten glass is caused to continuously flow slowly through the furnace beneath the curtain wall 19 into the refining end 7, and thence discharged through the delivery end 10 to the sheet or plate forming machine 11. As the molten glass flows through the refining end, it is adapted to be reduced in temperature by cooling air introduced into the furnace through the regenerative cooling means 21 and 22, and it will be understood that the cooling air is introduced into the furnace from one side thereof only at a time. In other words, when the cooling air is delivered into the furnace through the regenerative cooling means 21, the heated air will be simultaneously withdrawn through the regenerative cooling means 22 and vice versa.

More specifically, assuming it is desired to introduce the cooling air through the regenerative cooling means 21, the valves 36 and 37 thereof are opened while the dampers 38 and 39 are closed and at the same time the valves 36 and 37 of regenerative cooling means 22 are closed while the dampers 38 and 39 thereof are opened. With this arrangement, the draw of the stack 34 will create or set up a draft transversely in the refining end of the furnace, flowing from the regenerative cooling means 21 to the regenerative cooling means 22, so that cold air will be drawn in through the valves 36 and 37 of said regenerative cooling means 21. Simultaneously, the draft set up in the furnace will cause the heated air therein to be drawn outwardly through the regenerative cooling means 22.

At desired intervals, the operation of the regenerative cooling means 21 and 22 is adapted to be reversed so that the cooling air enters through regenerative cooling means 22 while the heated air is drawn outwardly through the regenerative cooling means 21, and this is accomplished by simply reversing the relative positions of the valves 36—37 and dampers 38—39, as will be readily understood. During the time the heated air is being withdrawn from the furnace through either regenerative means 21 or 22, it will, in passing through checker-works 25 or 26 thereof, act to heat the same so that upon reversal of the regenerative means, the cold air passing through the previously heated checker-work will absorb the heat therefrom so that it will be preheated to the desired extent upon entering the furnace. Thus, while the temperature of the cooling air is such that it will effect the required cooling or chilling of the glass, its temperature will be relatively higher than the atmospheric temperature so that it will not cause a too severe or abrupt chilling of the surface of the glass such as might have an adverse effect thereon. This will result in the cooling air being of a more uniform temperature which will have a more uniform cooling action on the glass. Likewise, a more uniform temperature condition can be maintained in the refining end of the furnace transversely thereof to assist in bringing the molten glass to a more even temperature when it reaches the delivery end of the furnace.

Due to the provision of the curtain wall 19, the temperature conditions at one end of the furnace can be regulated without affecting the temperature conditions at the opposite end thereof so that a desirable condition set up in the refining end will not be affected by changing conditions in the melting end and vice versa. Oftentimes, it is found necessary to vary the temperature conditions in the melting end of the furnace, and obviously where the melting end and refining end are in open communication, these changes will be transmitted to the latter which frequently causes trouble. By establishing the proper conditions in the melting and refining ends and maintaining such conditions, the problems of producing good quality molten glass are made much easier.

Under certain conditions, it might be found desirable to apply some heat to the molten glass in the refining end of the furnace and for this purpose gas burners 40 may be used. These burners are shown as projecting into the ports 30 at opposite sides of the refining end through the side walls of horizontal passages 29. By means of the burners 40, heat may be added to the cooling air to control the temperature thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A process of melting glass in a tank, which consists in supplying batch to one end of the tank, applying heat to melt the batch in such end, flowing the molten glass from the melting end of the tank through a refining zone into a working zone and in subjecting the molten glass during refining in said refining zone to cooling air having a temperature greater than the atmospheric temperature to condition the molten glass in said refining zone.

2. A process of melting glass in a tank, which consists in supplying batch to one end of the tank, applying heat to melt the batch in such end, flowing the molten glass from the melting end of the tank through a refining zone into a working zone subjecting the molten glass during refining in said refining zone to cooling air having a temperature greater than the atmospheric temperature to condition the molten glass in said refining zone, and in separating the heated air above the molten glass in the melting end of the tank from the heated air above the molten glass in the refining zone.

3. A process of melting glass in a tank, which consists in supplying batch to one end of the tank, applying heat to melt the batch in such end, flowing the molten glass from the melting end of the tank through a refining zone into a working zone and in supplying preheated cooling air to the refining zone of the tank to cool and condition the molten glass therein.

4. A process of melting glass in a tank, which consists in supplying batch to one end of the tank, applying heat to melt the batch in such end, flowing the molten glass from the melting end of the tank through a refining zone into a working zone supplying preheated cooling air to the refining zone of the tank to cool and condition the molten glass therein, and in separating the heated air above the molten glass in the melting end of the tank from the heated air above the molten glass in the refining zone.

5. A process of melting glass in a tank, which consists in supplying batch to one end of the tank, applying heat to melt the batch in such end, flowing the molten glass into the opposite end of said tank where it is refined, in subjecting the molten glass during refining to cooling air having a temperature greater than the atmospheric temperature, and in introducing the cooling air into the refining end of the tank alternately from opposite sides thereof.

6. A process of melting glass in a tank, which consists in supplying batch to one end of the tank, applying heat to melt the batch in such end, flowing the molten glass into the opposite end of said tank where it is refined, and in supplying preheated cooling air to the refining end of the tank alternately from opposite sides thereof to cool the molten glass therein.

7. A process of melting glass in a tank, which consists in supplying batch to one end of the tank, applying heat to melt the batch in such end, flowing the molten glass into the opposite end of said tank where it is refined, in subjecting the molten glass during refining to cooling air having a temperature greater than the atmospheric temperature, in introducing the cooling air into the refining end of the tank alternately from opposite sides thereof, and in separating the heated air above the molten glass in the melting end of the tank from the heated air above the molten glass in the refining end.

8. A process of melting glass in a tank, which consists in supplying batch to one end of the tank, applying heat to melt the batch in such end, flowing the molten glass into the opposite end of said tank where it is refined, in supplying preheated cooling air to the refining end of the tank alternately from opposite sides thereof to cool the molten glass therein, and in separating the heated air above the molten glass in the melting end of the tank from the heated air above the molten glass in the refining end.

9. A process of melting glass in a tank, which consists in supplying batch to one end of the tank, applying heat to melt the batch in such end, flowing the molten glass from the melting end of the tank through a refining zone into a working zone, withdrawing the heated air from above the molten glass in the refining zone of the tank through an opening at one side thereof, and in simultaneously drawing cooling air into said refining zone through an opening at the opposite side thereof to condition the molten glass therein.

10. A process of melting glass in a tank, which consists in supplying batch to one end of the tank, applying heat to melt the batch in such end, flowing the molten glass from the melting end of the tank through a refining zone into a working zone, withdrawing the heated air from above the molten glass in the refining zone of the tank through an opening at one side thereof, in simultaneously drawing cooling air into said refining zone through an opening at the opposite side thereof to condition the molten glass therein, and in preheating the cooling air before it enters said refining zone.

11. A process of melting glass in a tank, which consists in supplying batch to one end of the tank, applying heat to melt the batch in such end, flowing the molten glass into the opposite end of said tank where it is refined, withdrawing the heated air from above the molten glass in the refining end of the tank through an opening at one side thereof, in simultaneously drawing cooling air into said refining end through an opening at the opposite side thereof, in preheating the cooling air before it enters said tank, and in periodically reversing the operation to cause the preheated air to be withdrawn and the cooling air to enter said tank alternately from opposite sides.

12. A process of melting glass in a tank, which consists in supplying batch to one end of the tank, applying heat to melt the batch in such end, flowing the molten glass into the opposite end of said tank where it is refined, withdrawing the heated air from above the molten glass in the refining end of the tank through an opening at one side thereof, in simultaneously drawing cooling air into said refining end through an opening at the opposite side thereof, in preheating the cooling air before it enters said tank, in periodically reversing the operation to cause the preheated air to be withdrawn and the cooling air to enter said tank alternately from opposite sides, and in separating the heated air above the molten glass in the melting end of the tank from the heated air above the molten glass in the refining end.

13. In a glass melting furnace having a melting section, a refining section and a working section containing molten glass, means for separating said melting and refining sections above the molten glass, means for applying heat to said melting section to reduce the batch supplied thereto to molten glass, means for introducing cooling air into said refining section to condition the molten glass therein, and means for preheating said cooling air before it enters the refining section.

14. In a glass melting furnace having a melting section, a refining section and a work section containing molten glass, means for separating said melting and refining sections above the molten glass, means for applying heat to said melting section to reduce the batch supplied thereto to molten glass, means for withdrawing heated air from one side of the refining section of the furnace, and means for simultaneously introducing cooling air into the opposite side thereof to condition the molten glass therein.

15. In a glass melting furnace having a melting section, a refining section and a working section containing molten glass, means for separating said melting and refining sections above the molten glass, means for applying heat to said melting section to reduce the batch supplied thereto to molten glass, means for withdrawing heated air from one side of the refining section of the furnace, means for simultaneously introducing cooling air into the opposite side thereof to condition the molten glass therein, and means for preheating the cooling air before it enters the refining section.

16. In a glass melting furnace having a melting end and a refining end containing molten glass, means for separating said melting and refining ends above the molten glass, means for applying heat to said melting end to reduce the batch supplied thereto to molten glass, means for withdrawing heated air from one side of the refining end of the furnace, means for simultaneously introducing cooling air into the opposite side thereof, means for preheating the cooling air before it enters the furnace, and means effective for reversing the operation of said air withdrawing means and air introducing means to cause the preheated air to enter said furnace alternately from opposite sides thereof.

17. In a glass melting furnace having a melting end and a refining end containing molten glass, means for separating said melting and refining ends above the molten glass, means for applying heat to said melting end to reduce the batch supplied thereto to molten glass, and reversible regenerative cooling means arranged at opposite sides of said furnace and communicating with the refining end thereof to introduce cooling air thereinto first from one side of the furnace and then the other.

18. In a glass melting furnace having a melting section, a refining section and a working section containing molten glass, means for separating said melting and refining sections above the molten glass, means for applying heat to said melting section to reduce the batch supplied thereto to molten glass, the refining section of the furnace having openings at opposite sides thereof above the molten glass, and means for creating a draft transversely of said refining section to withdraw the heated air through the opening at one side and simultaneously draw air into said refining section through the opening at the opposite side to condition the molten glass therein.

19. In a glass melting furnace having a melting end and a refining end containing molten glass, means for separating said melting and refining ends above the molten glass, means for applying heat to said melting end to reduce the batch supplied thereto to molten glass, the refining end of the furnace having openings at opposite sides thereof above the molten glass, means for creating a draft transversely of said refining end to withdraw the heated air through the opening at one side and simultaneously draw air into said refining end through the opening at the opposite side, and means effective for reversing the operation of said last-mentioned means to cause the draft to travel transversely of said refining end alternately in opposite directions.

20. In a glass melting furnace having a melting section, a refining section and a working section containing molten glass, means for separating said melting and refining sections above the molten glass, means for applying heat to said melting section to reduce the batch supplied thereto to molten glass, means for introducing cooling air into said refining section to condition the molten glass therein, and means for controlling the temperature of said cooling air.

21. A process of melting glass in a tank, which consists in supplying batch to one end of the tank, applying heat to melt the batch in such end, flowing the molten glass from the melting end of the tank through a refining zone into a working zone, and in setting up a draft transversely of the refining zone of the tank to withdraw heated air from said refining zone through an opening at one side thereof and for simultaneously drawing cooling air into the said refining zone through an opening at the opposite side thereof to condition the molten glass therein.

22. A process of melting glass in a tank, which consists in supplying batch to one end of the tank, applying heat to melt the batch in such end, flowing the molten glass from the melting end of the tank through a refining zone into a working zone, in setting up a draft transversely of the refining zone of the tank to withdraw heated air from said refining zone through an opening at one side thereof and for simultaneously drawing cooling air into the said refining zone through an opening at the opposite side thereof to condition the molten glass therein, and in maintaining the heated air above the molten glass in the melting end of the tank separated from the heated air above the molten glass in the refining zone.

JOHN L. DRAKE.